(12) United States Patent
Chojnacki (10) Patent No.: US 11,116,147 B1
(45) Date of Patent: Sep. 14, 2021

(54) SYSTEM AND METHOD FOR STABILIZING CONTAINERIZED PLANTS

(71) Applicant: Brian Chojnacki, Parkhill, OK (US)

(72) Inventor: Brian Chojnacki, Parkhill, OK (US)

( * ) Notice: Subject to any disclaimer, the term of this patent is extended or adjusted under 35 U.S.C. 154(b) by 464 days.

(21) Appl. No.: 15/880,785

(22) Filed: Jan. 26, 2018

(51) Int. Cl.
| | | |
|---|---|---|
| *A01G 9/02* | (2018.01) | |
| *A01G 9/12* | (2006.01) | |
| *A01G 9/00* | (2018.01) | |
| *A01G 25/02* | (2006.01) | |
| *A01G 9/029* | (2018.01) | |
| *A01G 9/14* | (2006.01) | |

(52) U.S. Cl.
CPC ............... *A01G 9/12* (2013.01); *A01G 9/006* (2013.01); *A01G 9/027* (2013.01); *A01G 9/0295* (2018.02); *A01G 9/0297* (2018.02); *A01G 25/02* (2013.01); *A01G 9/14* (2013.01)

(58) Field of Classification Search
CPC ..... A01G 9/027; A01G 9/0295; A01G 9/0297
USPC ............... 47/18, 39, 48.5, 65.5, 65.9, 79, 85
See application file for complete search history.

(56) References Cited

U.S. PATENT DOCUMENTS

| | | | | |
|---|---|---|---|---|
| 1,300,629 A * | 4/1919 | Macaw | ................... | A47B 73/00 211/74 |
| 2,545,717 A * | 3/1951 | Voigt | ................... | A01G 9/1423 47/18 |
| 3,542,210 A | 11/1970 | Sorensen | | |
| 3,784,044 A * | 1/1974 | Bruggeman | ........... | B65D 7/065 206/512 |
| 3,866,788 A * | 2/1975 | Smit | ..................... | B65D 7/065 220/486 |
| 4,381,838 A * | 5/1983 | Boogaart | ............... | A01G 9/143 211/85.23 |
| 4,756,119 A | 8/1988 | Chabot | | |
| 5,711,433 A * | 1/1998 | Smith | ..................... | A47G 7/044 211/113 |
| 5,836,105 A | 11/1998 | Loosen | | |
| 6,029,399 A * | 2/2000 | Mercer | ................ | A01G 9/0295 47/66.5 |
| 6,032,808 A * | 3/2000 | Henson | .................. | A47G 7/044 211/85.23 |

(Continued)

OTHER PUBLICATIONS

Better Built Products, Inc., Better Bilt Plant Stabilizers. Addison, IL. 2017. http://www.bbponline.com.

*Primary Examiner* — David J Parsley
(74) *Attorney, Agent, or Firm* — Margaret Millikin (57) ABSTRACT

A method and system for supporting containerized plants in an upright and stationary position and at customizable, uniform spacing therebetween. The system comprises a frame, pockets, stabilizers positioned within the pockets and spacers. The pockets, stabilizers and spacers provide both horizontal and vertical support to each containerized plant, holding it securely in place without stakes or cables. The pockets with stabilizers and the spacers may be arranged in various patterns to promote stability of the system and health of the containerized plants. An irrigation system may be coupled to the system for maintaining and nourishing plants. The length of the frame is greater than the width, thus creating a stable environment to combat winds and disruptive forces. Individual frames may be attached to form designated and defined uniform growing or display areas and provide greater stability.

28 Claims, 9 Drawing Sheets

(56) References Cited

U.S. PATENT DOCUMENTS

| | | | | |
|---|---|---|---|---|
| 6,138,403 A | * | 10/2000 | Bartlett, Jr. | A01G 9/1423 47/18 |
| 6,854,210 B2 | | 2/2005 | Gunderman | |
| 6,895,712 B2 | | 5/2005 | Gunderman et al. | |
| 7,013,598 B2 | | 3/2006 | Powless | |
| 7,036,270 B1 | * | 5/2006 | Shepherd | A01G 9/16 47/18 |
| 7,815,059 B2 | * | 10/2010 | Mulholland | A47G 7/041 211/85.23 |
| D635,890 S | | 3/2011 | Sutton-Russo | |
| D682,151 S | | 5/2013 | Kinzer | |
| 2008/0155892 A1 | * | 7/2008 | Katzir-Shimoni | A01G 25/02 47/39 |

\* cited by examiner

SYSTEM AND METHOD FOR STABILIZING CONTAINERIZED PLANTS

TECHNICAL FIELD OF THE INVENTION

The present invention relates generally to systems and devices for stabilizing and supporting containerized plants and, more particularly, but not by way of limitation, to systems and devices for stabilizing and supporting containerized plants in a nursery setting. Methods of stabilizing containerized plants are also provided.

SUMMARY OF THE INVENTION

The present invention is directed to a plant stabilization system for containerized plants. The plant stabilization system comprises a frame, a plurality of stabilizers positioned within a plurality of pockets formed in the frame, the plurality of stabilizers adapted to support a plurality of containerized plants, and plurality of spacers The present invention is further directed to a method of stabilizing containerized plants, wherein each of the plurality of containerized plants has a center of gravity, the method comprising the step of providing counterweight leverage at a point below the center of gravity via the systems frame design itself and utilizing the other containerized plants being held within the system The present invention further is directed to a plant stabilization system for containerized plants. The plant stabilization system comprises a frame and a plurality of stabilizers positioned within a plurality of pockets formed in the frame, the plurality of stabilizers adapted to support a plurality of containerized plants.

DETAILED DESCRIPTION OF THE INVENTION

The present invention relates to the horticulture industry, including plant growing facilities, garden centers, nurseries, greenhouse operations, and anywhere containerized plants are grown, distributed, displayed or sold, in both wholesale and retail environments. In the horticulture industry, nurseries may specialize in the propagation, growing or retail sale of plants.

Wholesalers, distributors and retailers in the horticulture industry experience difficulties in securely retaining containerized plants in a stationary, upright position. This problem is particularly pronounced for vulnerable plants, such as woody ornamental shrubs and trees, during growth, sale and transport operations. These challenges negatively impact the entire horticulture industry, both operationally and economically.

Securely maintaining containerized growing plants and trees in an erect position is imperative to growing a healthy, quality plant or tree. Maintaining uniform and adequate spacing between containerized grown plants and trees is essential for healthy cultivation. Proper spacing allows suitable air circulation and sunlight exposure, which, in turn, enhances the overall health of the plants, allows for proper branching and structural development and increases plant leaf counts and fullness. Proper spacing between plants and trees also reduces the environmental threats from diseases and insects, thus producing a healthier, more desirable plant.

Maintaining consistent and uniform plant and tree growing bed boundaries is very beneficial in growing, distribution and selling facilities. It also is aesthetically pleasing, as well as functionally and horticulturally beneficial. Throughout the industry, containerized growing plants are shuffled about, pushed together, tipped over or unintentionally relocated. In particular, large plants and trees easily topple over or shift due to multiple causes. Winds frequently tip over plants and, although wind has a greater effect on taller growing containerized plants like trees, it also effects containerized plants of all sizes. Other forces and factors, including water hoses, spray hoses, animals, overhead watering, rain, customers and employees, may trigger the collapse of a plant or cause a plant to shift in location. The economic cost associated with unsecure plants is substantial throughout the industry.

In both wholesale and retail environments, maintaining plants in a secure and orderly fashion is imperative to customer and employee safety and to productivity. Plants that have fallen over become obstacles that pose safety issues and trip hazards. Additionally, labor costs increase when plants and trees are not secured in place and in an upright position. Employees are detracted from productive duties and must spend time standing up fallen plants, reorganizing and respacing rows for inventory, and maintaining proper growth conditions. These ongoing labor costs directly increase production costs.

Fallen plants also suffer damage, which increases operational costs. Plants that tip over are not properly watered or maintained, resulting in damage or death of the plant. In the retail environment, organized displays of containerized plants are aesthetically pleasing and increase positive customer experiences, which results in increased sales.

Conventional stabilizers primarily are directed to holding individual containers or multiples of smaller plants but provide little leveraged support to maintain plants upright, particularly large plants. To date, existing traditional stabilizers are not designed to support and uniformly space containerized, growing plants, particularly, but not by way of limitation, vulnerable plants, top-heavy plants, and other plants susceptible to tipping over, including woody shrubs and tree. These devices may provide temporary spacing yet still allow horizontal movement of the plant, unless anchors penetrate the underlying substrate, which limits their usefulness to soft and penetrable surfaces. Conventional devices with anchors are not workable on asphalt, chat, packed dirt, concrete and the like. These traditional devices may separately maintain the plants upright, but cannot maintain spacing unless anchors are used, which further limits their application. Moreover, conventional devices do not create uniform growing beds nor are they functionally adaptable to support multiple and varying sizes of growing containers within one unit.

The stabilizing system of the present invention overcomes these problems by providing an integral, lightweight, structurally sturdy unit that securely supports multiple containerized plants in an upright and stationary position, particularly vulnerable plants, such as top-heavy plants and mature plants. As used herein, the phrase "vulnerable" means containerized plants that meet one more of the following criteria: are naturally or inherently become (1) top-heavy, (2) susceptible to tipping over from conditions such as wind, human and animal interaction, or (3) large plants greater than two gallons in size. However, it will be appreciated that the plant stabilization system of the present invention also is adaptable for use with varying sizes of containerized plants.

The size and spacing configuration of present invention is customizable to achieve the desired spacing between growing containers of multiple and varied diameters and dimensions of the containers being held. The stabilizing system of the present invention is functional on any surface and overcomes the inherent problems associated with growing and displaying unsecured, individual, containerized plants, and particularly, but not by way of limitation, vulnerable plants. The present invention comprises a one-piece integral unit capable of securely holding containerized plants in both vertically upright and horizontally spaced positions and of growing and displaying containerized plants, including shrubs and trees. The system securely holds multiple containerized plants or trees in a stationary and vertically upright position and creates uniform growing beds without the use of anchors that penetrate into the underlying substrate. The stabilizing system of present invention is cost effective to manufacture, but is structurally strong and light weight and shippable via common carriers.

The one-piece integral design offers many benefits. It enables the system to be effortlessly set up on site without construction tools and enables the system to be easily moved on location or transported to another location. The one-piece integral design also permits more than one unit to be stacked or nested together vertically, thus facilitating efficient shipping of multiple stabilizing systems. Multiple stabilizing systems may be linked or connected end to end to enhance stability and uniformity. However, single units are fully functional and structurally strong enough to support a grown man who may walk on the unit while tending to the plants. The units are not dependent on multiplicity for optimal performance.

The stabilizing system of the present invention withstands harsh environmental conditions and provides adjustable container stabilizer legs to accommodate containers of varying dimensions within one unit. The stabilizing system can be custom designed, configured and fabricated to the customer's specifications regarding width, length, height, quantity of containers to be held, spacing between containers, spacing dimensions and spacing configuration, including, by way of example but without limitation, single or multiple per rows, zig-zagged, offset spacing.

The stabilizing system of the present invention also accommodates a variety of types of irrigation systems, including an optional micro irrigation system. Finally, the system accepts signage for identification purposes of the plants contained therein. These and other advantages of the present invention will be apparent from the following description of embodiments.

Figure 1:
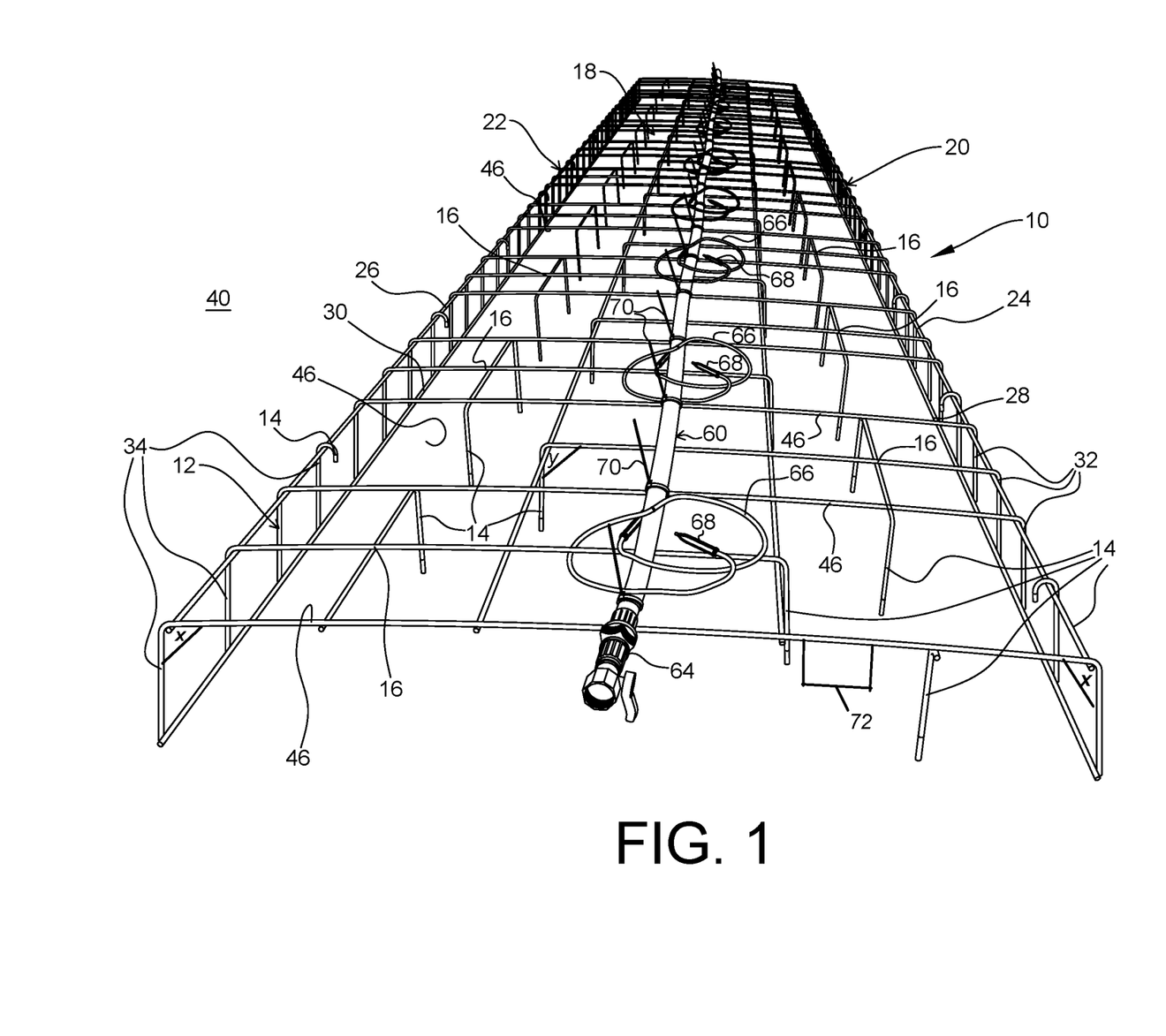
FIG. 1 is a front perspective view of an exemplar of a plant stabilization system present invention.
Figure 2:
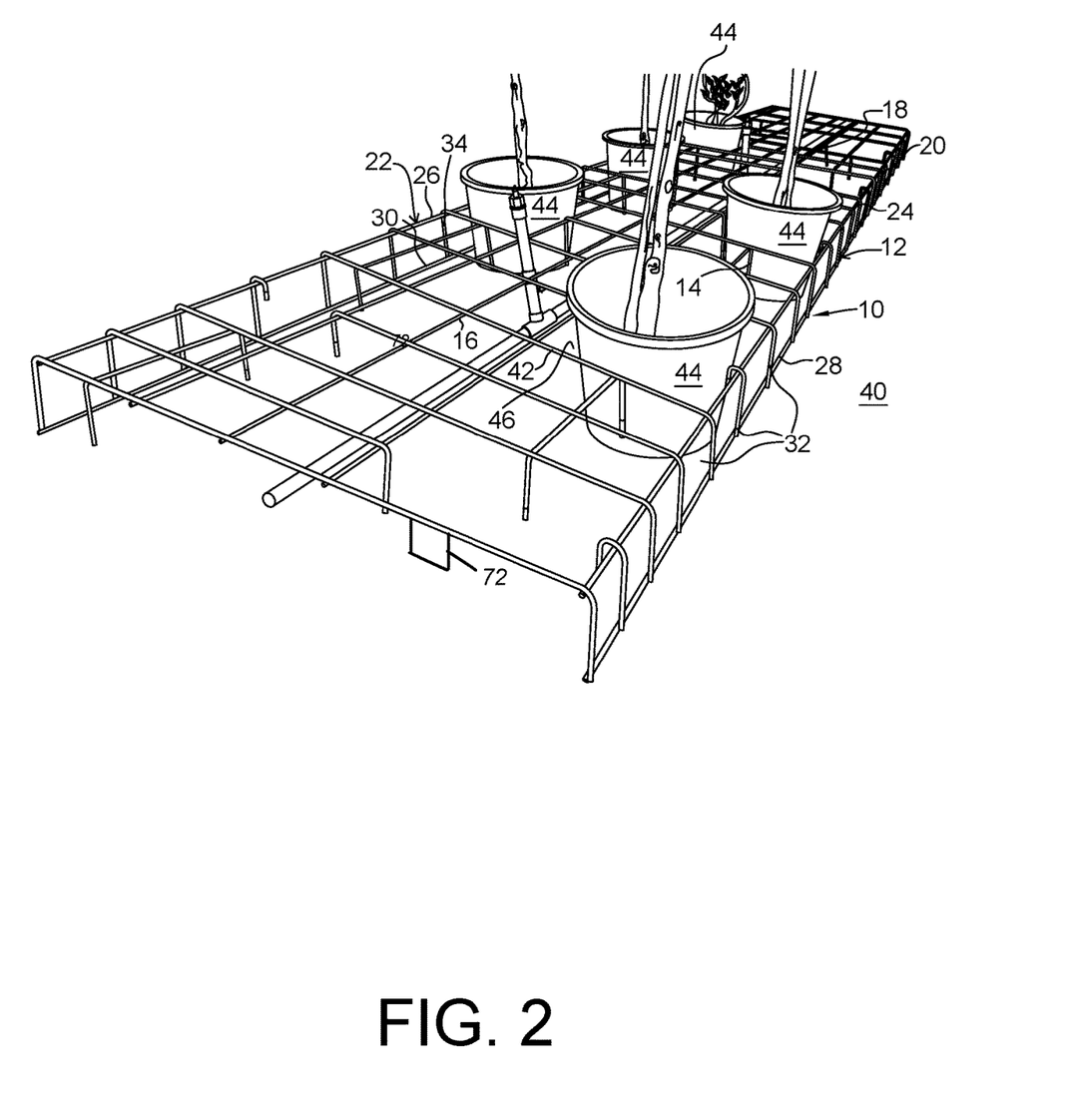
FIG. 2 is a right side perspective view of an exemplar of a plant stabilization system of the present invention.

Turning now to the drawings in general, and to FIGS. 1 and 2 in particular, there is shown therein a perspective view of a plant stabilization system 10 of the present invention. The plant stabilization system 10 depicted in FIGS. 1 and 2 shows a single unit or frame 12. It will be appreciated that multiple units may be employed together.

The system 10 comprises a frame 12, stabilizers 14 and spacers 16. The stabilization system 10 of the present invention is applicable across a wide range of container sizes and crop specific spacing. It is an added feature of this invention that the frame 12, stabilizers 14 and spacers 16 may be customized for specific needs and applications in a manner yet to be described.

The frame 12 comprises a top side 18 and two support structures 20 and 22 that extend the length of the longest sides of the frame. Support structures 20 and 22 may be angled outward with respect to the top side 18 of the frame 12 at an angle of about 91 degrees to about 179 degrees, as shown by angle x in FIG. 1, which enables individual units of the system 10 to be stacked or nested. In one embodiment of the invention, the support structures 20 and 22 are angled outward at an angle of about 100 to about 175 degrees with respect to the top side 18 of the frame 12. In another embodiment of the invention, the support structures 20 and 22 are angled outward at an angle of about 90 to about 135 degrees with respect to the top side 18 of the frame 12. The outwardly angled support structures 20 and 22 enable multiple units of the plant stabilization system 10 to be stored and transported efficiently while in a stacked or nested configuration. In one embodiment of the invention, support structure 20 comprises a top horizontal support member 24 and a bottom horizontal support member 28, and the bottom horizontal support member 28 is positioned distally with respect to the top side 18 of the frame 12 and its respective top horizontal support member 24 to enable nesting of multiple frames comprising the system, while support member 22 comprises a top horizontal support member 26 and a bottom horizontal support member 30, and the bottom horizontal support member 30 is positioned distally with respect to the top side 18 of the frame 12 and its respective top horizontal support member 26 to enable nesting of multiple frames comprising the system. A plurality of substantially vertical connecting supports 32 and 34 connect the top horizontal support members 24 and 26 to the bottom horizontal support members 28 and 30, respectively, and are angled outward with respect to the top side 18 of frame 12 at an angle of about 91 degrees to about 179 degrees. In one embodiment of the invention, the substantially vertical connecting supports 32 and 34 are angled outward at an angle of about 100 to about 175 degrees with respect to the top side 18 of the frame 12. In another embodiment of the invention, the connecting supports 32 and 34 are angled outward at an angle of about 90 to about 135 degrees with respect to the top side 18 of the frame 12. The top side 18 is raised above the substrate 40 upon which the system 10 rests by support structures 20 and 22, creating a voided space 42 between top side 18 and the substrate 40 upon which the system 10 rests.

With continuing reference to FIGS. 1 and 2, the dimensions of the frame 12 are variable and customizable. In one embodiment, the dimensions of the frame 12 are multiple times longer in length than width, creating a one-piece unit of a rectangular shape. For example, but without limitation, the frame 12 may range from about 52 inches in width to about 192 inches in length. References herein to diameters are to outside diameters, unless specifically stated to reference an inside diameter. It will be appreciated, however, that the frame 12 can be designed and fabricated to varying widths and lengths to accommodate specific needs and conditions at the sites where in use, such as size of plants, type of plants and number of plants to be supported within the system 10.

The frame may be constructed of any material suitable for use in plant nursery management, including steel, chrome, steel chrome-plated, steel with nickel/silicon carbide composite coating, brass, brass-chrome plated, brass with nickel/silicon carbide composite, stainless steel, stainless chrome-plated, stainless with nickel/silicon carbide composite coating, carbonitrided steel, nickel carbide plated steel, tempered steel, polyvinylchloride, plastics, polymers, glass or carbon composites, alloys and mixture of the foregoing. It will be appreciated that the frame 12 may be produced from any materials suited to the particular temperatures, fluids, soils, alkalinity, weather and other conditions at the site where in use. The material should be strong, yet lightweight enough to be carried or moved without mechanical means and flexible to permit bending for a purpose yet to be described. In one embodiment of the invention, the frame 12 is constructed of 4-gauge galvanized steel wire, although thicker or thinner gauge wire may be used. The frame 12 may be coated to prevent corrosion with, for example but not limited to, a polymer coating such as polyamide, polyester or polyurethane.

The frame 12 forms a plurality of pockets 46, which are voids or receptacles for receiving containerized plants 44. The number of pockets 46 formed by the frame 12 ranges from about 2 to about 100. In one embodiment of the invention, the number of pockets 46 in the frame 12 would number at least 20. Within the pockets 46 are formed the stabilizers 14 for supporting and stabilizing containerized plants 44. The stabilization system 10 of the present invention is applicable across a wide range of applications, container sizes and crop specific spacing. To that end, the designing and fabrication process of the system 10 allows customization of the overall dimensional size of the frame 12, as well as the pockets 46, stabilizers 14 and spacers 16 to meet customer specifications. This gives the stabilization system 10 versatility to serve a greater portion of the horticulture industry, and not just one container size, spacing requirement or application.

Figure 3:
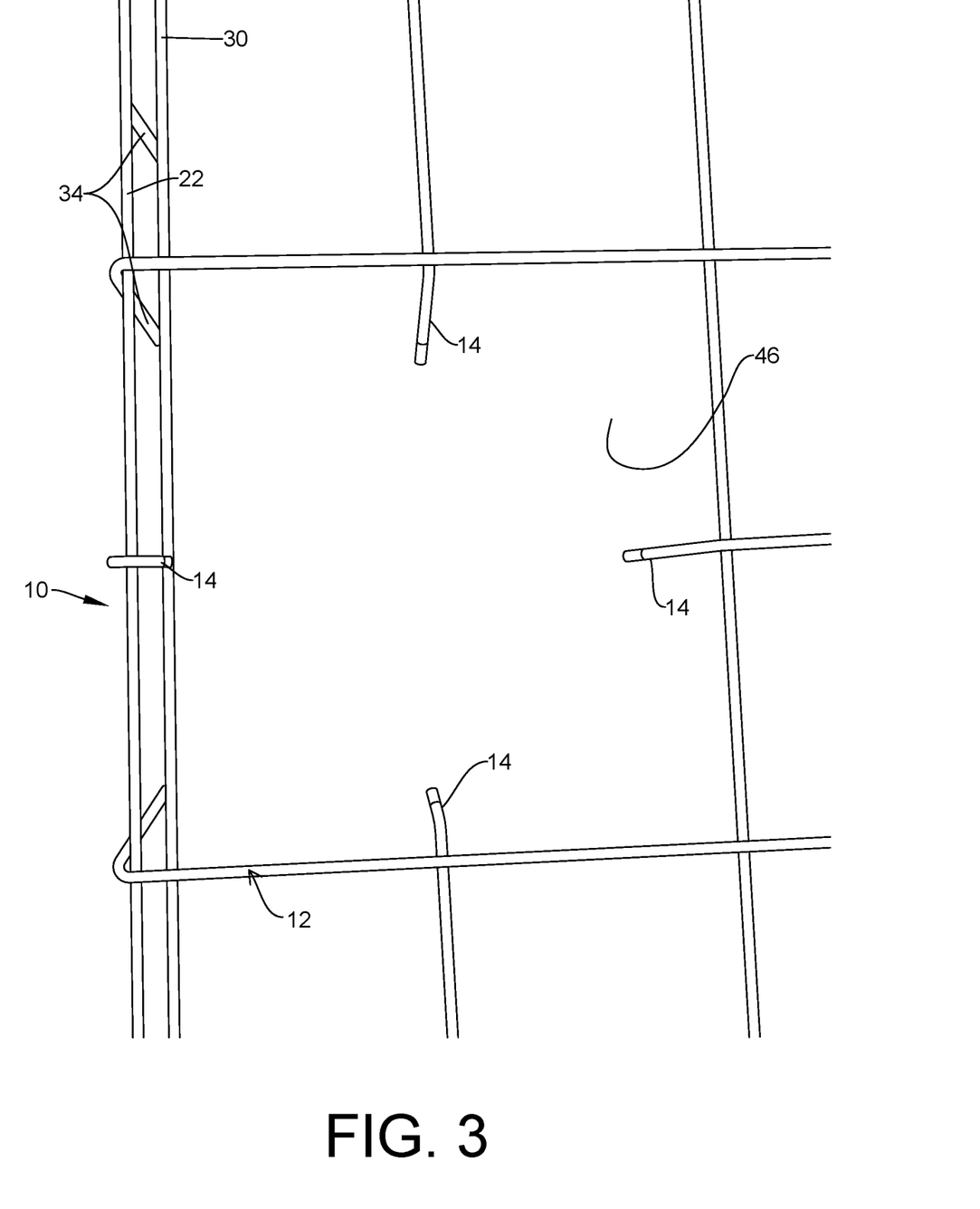
FIG. 3 is a top plan view of an exemplar of the pockets and stabilizers of the plant stabilization system of the present invention.

Turning now to FIG. 3, but with continuing reference to FIGS. 1 and 2, the stabilizers 14 formed within pockets 46 contact, or at least approach, the containerized plants 44 held or to be received with the pockets. The stabilizers 14 retain the containerized plants 44 in a vertical and upright position. The stabilizers 14, as well as the overall, size, weight and design of the frame 12, create counterweight leverage at a low point of a containerized plant 44, which allows the plant to resist forces which would normally cause the plant to fall over or be moved from its position on the substrate 40. This is particularly useful for containerized, plants 44 such as trees and larger woody shrubs. For creating sufficient counterweight leverage, the length of the stabilizers 14 within the pockets 46 are at least about 25% of the height of the frame 12 as measured from the top surface 18 of the frame to the substrate 40. It will be appreciated that the length of the stabilizers 14 may equal the height of the frame 12 as measured from the top surface 18 of the frame to the substrate. In order maintain structural integrity and strength of the frame 12, the angle x of the side support members 20 and 22 may vary with respect to the top side 18 of the frame to enable the stabilizers 14 to approach or touch the substrate 40, and in one embodiment of the invention that angle x of the side support members 20 and 22 increases with respect to the top side of the frame to enable the stabilizers 14 to approach or touch the substrate.

Figure 4:
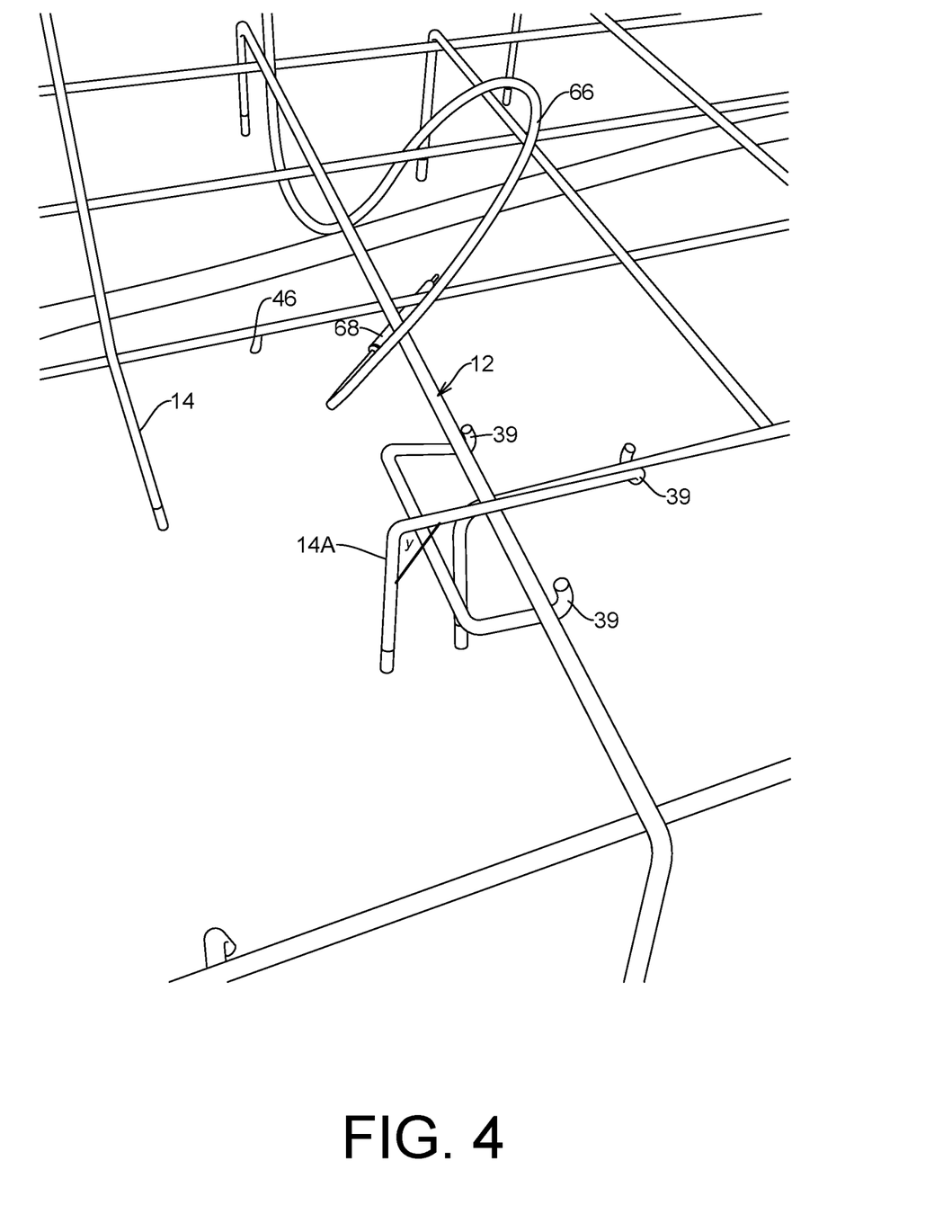
FIG. 4 is a perspective view of an exemplar of a separately formed stabilizer which is connectable the plant stabilization system and adaptable to the size of containerized plants.
Figure 8:
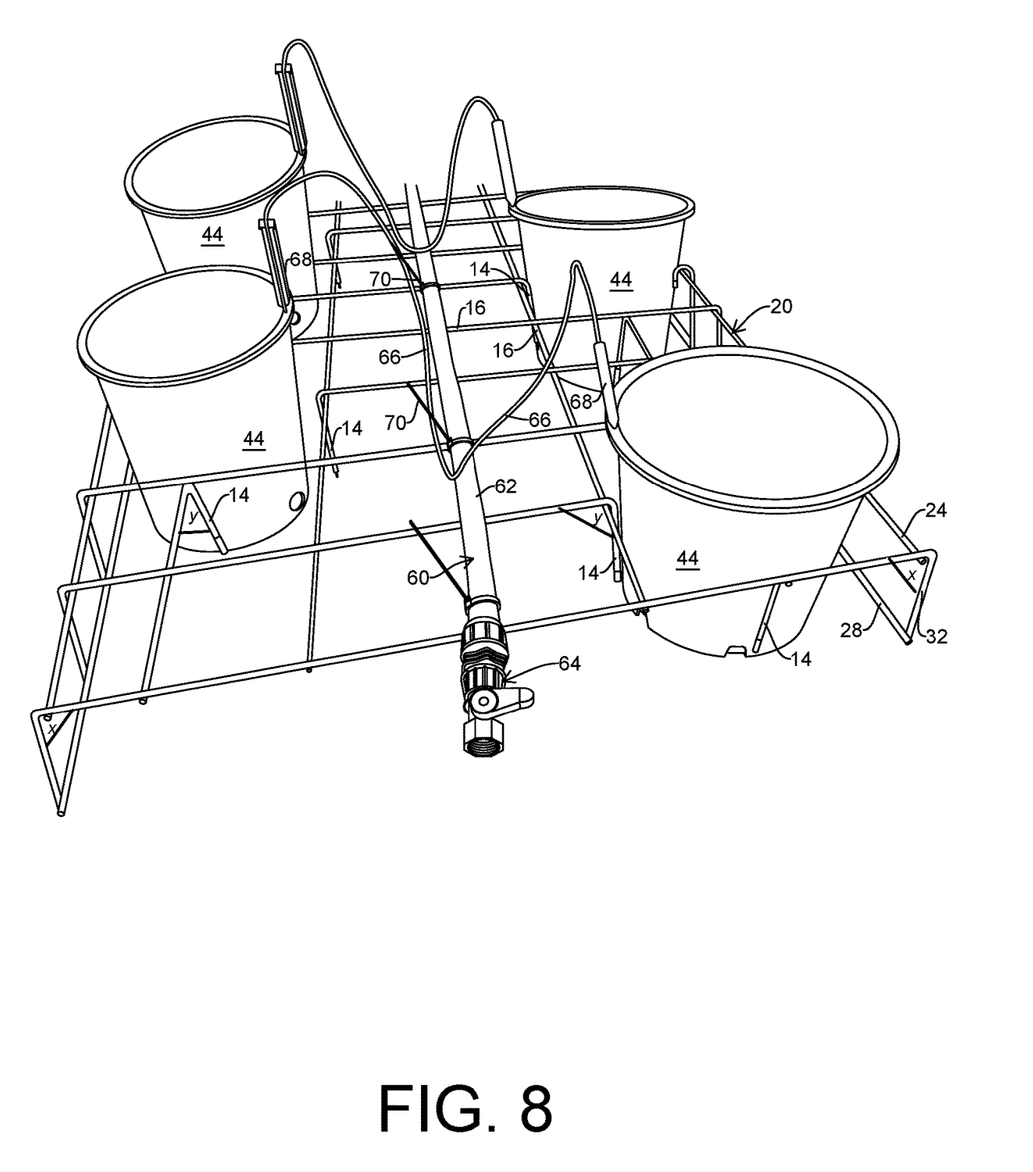
FIG. 8 is an end view of an exemplar of the irrigation system of FIG. 7.

In one embodiment of the invention, the stabilizers 14 form downwardly extending legs that engage the sides of the containerized plants 44 in the frame 12. The stabilizers 14 may be angled toward the containerized plant at an angle y, as shown in FIGS. 1, 4 and 8, of about 90 degrees to about 180 degrees with respect to the top side 18 of the frame 12 in order to more firmly contact the containerized plants held in pockets 46. In another embodiment of the invention, the stabilizers 14 are angled toward the containerized plant at an angle y of between about 91 to about 135 degrees with respect to the top side 18 of the frame 12. Containerized plants 44 are held firmly in the pockets 46 by the force of static pressure provided by the stabilizers 14. For optimal performance, the stabilizers 14 engagingly contact the containerized plant 44. However, it will be appreciated that the stabilizers 14 will provide vertical support to a containerized plant 44 even if not in constant direct contact with the container as long as they are proximal to the container.

Due to lack of product uniformity standards pertaining specifically to growing containers in the horticulture industry, the stabilizers 14 are adjustable to the size of the containerized plant 44 to be received in pockets 46. In one embodiment of the invention, the stabilizers 14 are constructed from the same material as the frame 16 and may be bent, straightened and re-bent to fit various containers of various dimensions and shapes, including circular, rectangular or square. In an alternative embodiment, as shown by way of example in FIG. 4, the pockets 46 are additionally resizable to accept smaller diameter containers by attaching a separate, preformed stabilizer 14A designed and fabricated in varying sizes which attach to frame 12 and allow additional incremental, resizing of the pocket dimensions and can provide additional stabilizer length not provided by the means of the permanent stabilizer 14, thus providing additional container size range acceptability which is outside of the adjustment range of the stabilizer 14. This adjustable preformed stabilizer 14A may be affixed to the frame 12 by the means of clipping, screwing, bolting, welding, or other securing means. As shown in FIG. 4, the preformed stabilizer 14A attaches to the frame 12 via hooks 39.

In those embodiments of the stabilization system 10 in which the stabilizers 14 form downwardly extending legs, the stabilizers may be angled as hereinbefore described as the stabilizers approach the underlying substrate 40 on which the system 10 rests. This allows efficient nesting properties of multiple units for storage and shipping purposes.

The ability for the invention fabrication process to allow custom spacing between the pockets 46 to meet the customer's specific request is imperative to the uniqueness and functionality of the invention.

In one embodiment of the invention, the stabilizers 14 extend fully downward to the underlying substrate 40, thus providing additional vertical structure and support to the frame 12 and, in particular, to the center portion of the frame. When in contact with the substrate 30, the stabilizers 14 provide resistance against collapse from vertical forces which might be applied to the top surface 18 of the system 10. For example, if a person walks on the frame 12 while watering or maintaining the plants or sets a heavy 50-gallon plant on the top surface 18 of the frame, the stabilizers 14 also provide structural support and integrity to the overall stabilization system 10. Stabilizers 14 eliminate the need for conventional substrate-penetrating anchors to hold a plant in place.

The number and dimensions of the pockets 46 and length of the downward extending stabilizers 14 are variable based on the specific container size, customer specifications and application. The overall dimensions of the frame 12 are dependent upon the size of pockets, the spacing between pockets and the number of pockets per unit. All of these variables may be tailored to customer specifications. The open grid design allows the performance of air root pruning containers to be maximized and permits maximum oxygen exchange for optimum root growth.

Figure 5:
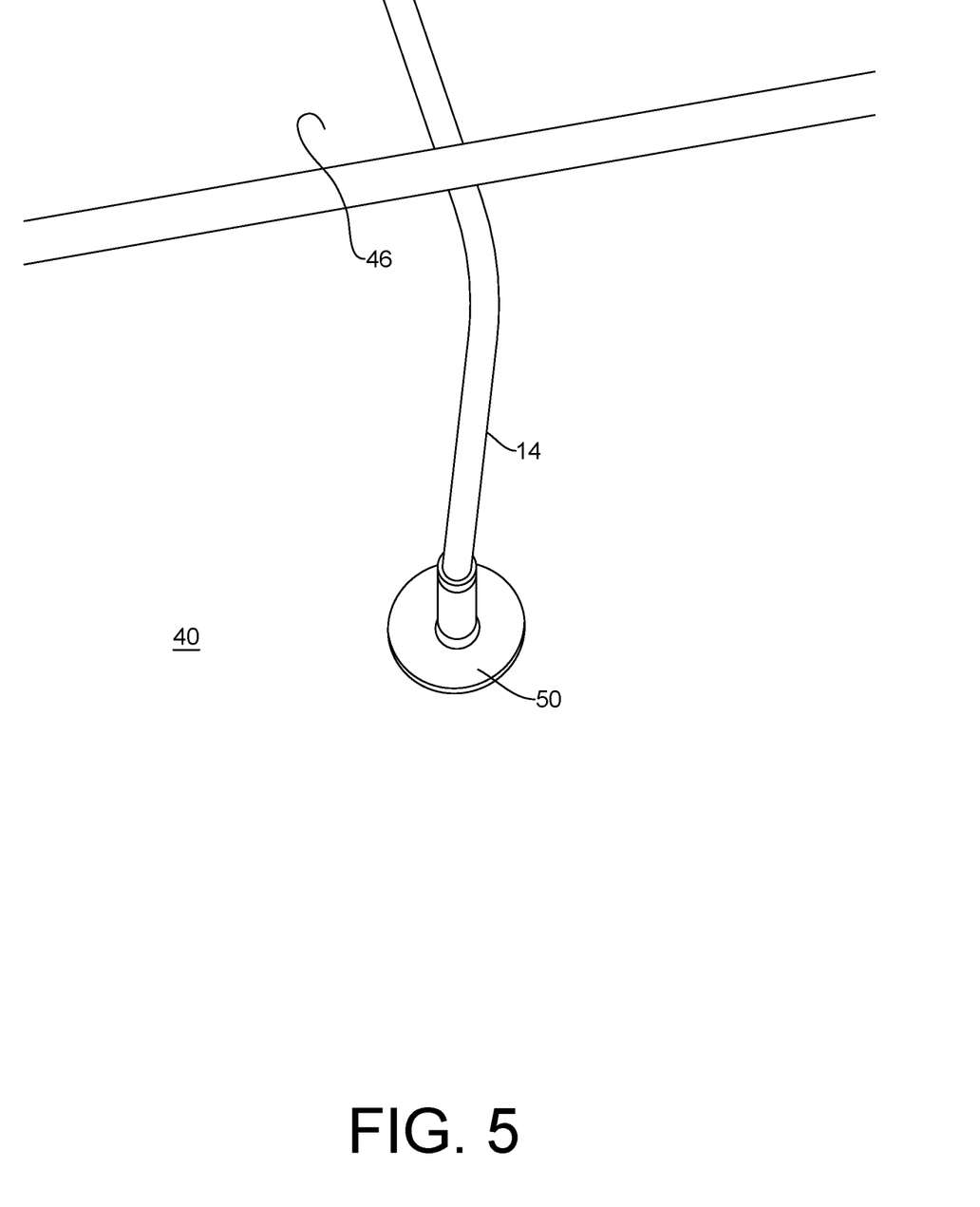
FIG. 5 is a top perspective view of an exemplar of the feet for the stabilizers of the plant stabilization system of the present invention.

Turning now to FIG. 5, the stabilizers 14 may further comprise feet 50 to expand the surface area where the stabilizer contacts the underlying substrate 40. The feet 50 distribute the weight of the frame 12 and objects positioned or people walking on the system 10. The feet 50 are particularly beneficial when the underlying surface 40 is soft and may be penetrated or marred by the smaller surface area of the stabilizer 14. Support feet 50 also help support the middle of the frame 10 and prevent the stabilizers 14 from penetrating the underlying substrate 40 below the device. Support feet 50 may be made of various materials, including plastic, rubber, metal, composites, alloys, or other materials suitable for the application and conditions at the site. The feet 50, in conjunction with stabilizers 14, eliminate the need for any additional means to anchor the stabilization system 10 to the substrate 40 and add protection from environmental degradation of the stabilizers 14.

Figure 6A:
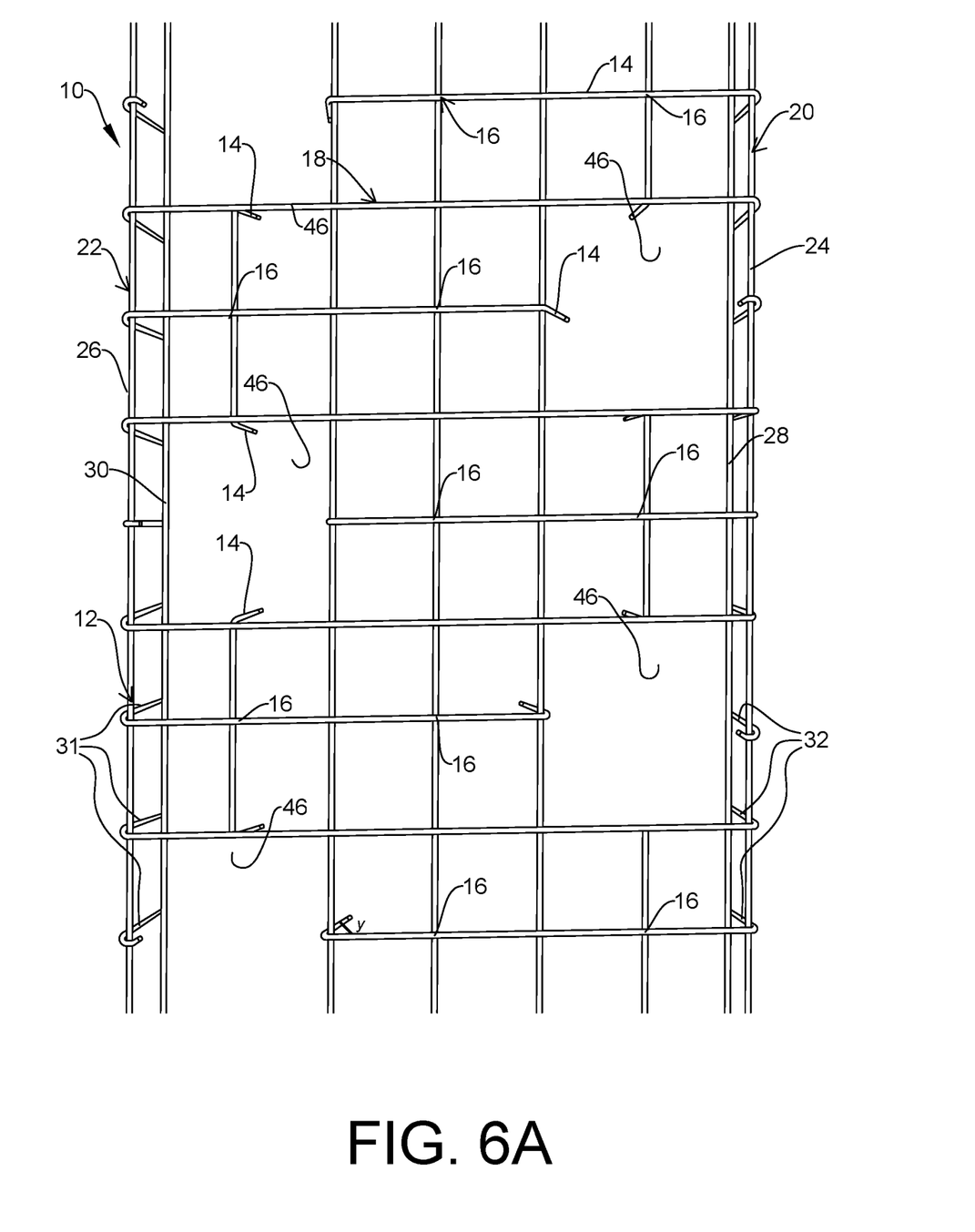
FIG. 6A is a top plan view of an exemplar of the plant stabilization system of the present invention illustrating a representative grid pattern spacing between stabilizers and spacers.
Figure 6B:
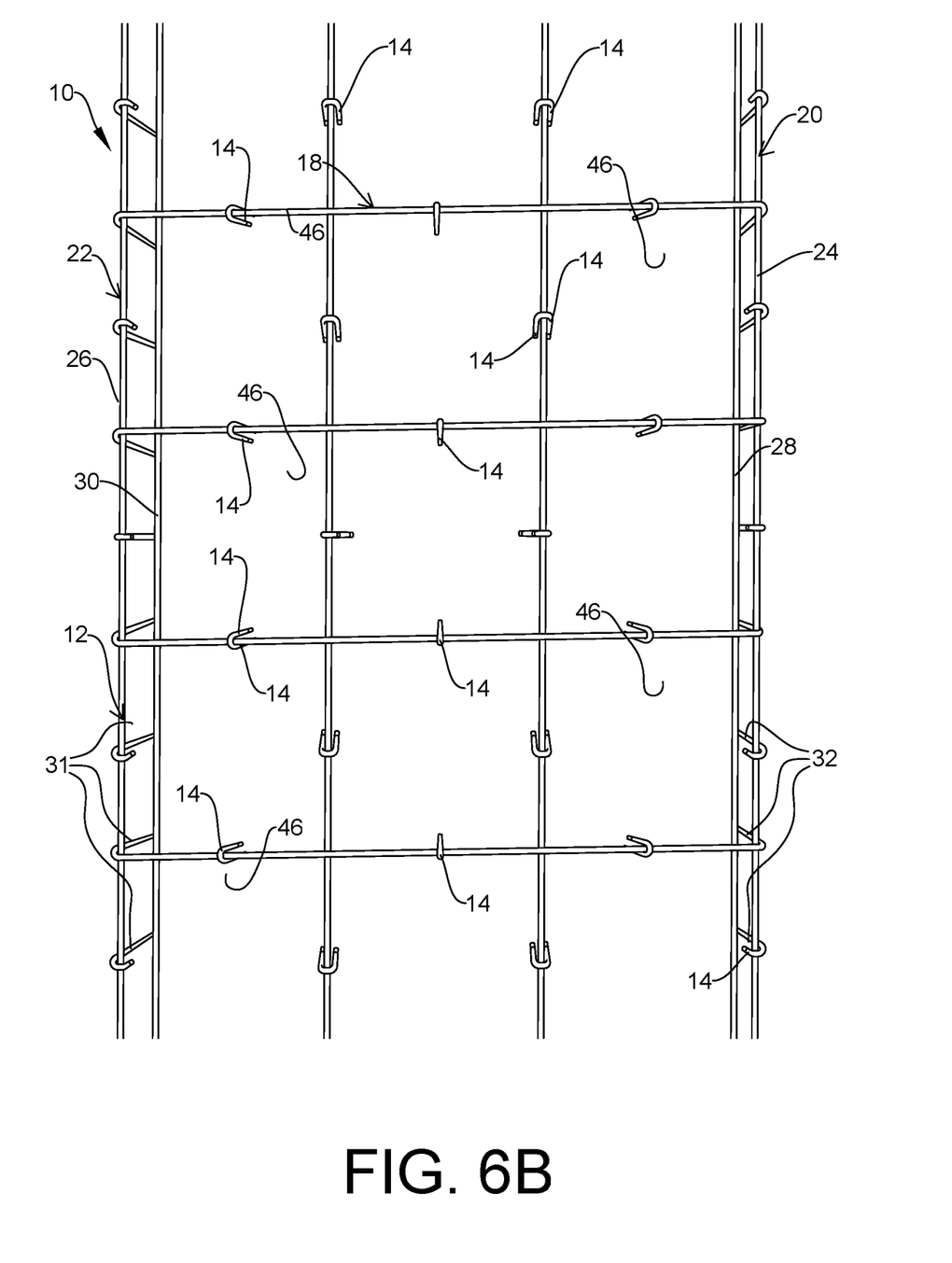
FIG. 6B is a top plan view of an exemplar of the plant stabilization system of the present invention without spacers.

Turning now to FIGS. 6A and 6B, but with continuing reference to FIGS. 1 and 2, spacers 16 are positioned between pockets 46 and serve a number of purposes. Spacers 16 provide additional structural support between the pockets 46, increasing rigidity of the frame 12 against crushing, collapsing and flimsiness. In one embodiment of the invention, the spacers 16 are formed by cross-bars as part of the surface 18 of the frame 12. As shown in FIGS. 1, 2, 6A and 6B, the spacers 16 are positioned between two pockets 46 to form a geometric grid pattern which facilitates the growth and maintenance of containerized plants 44 held in the stabilization system 10. However, the pockets 46 and spacers 16 of the stabilization system 10 may form various patterns. The intergraded spacers 16 between pockets 46 add strength and rigidity, allowing for a much larger system to be manufactured to accommodate vulnerable containerized plants 44. It will be appreciated that spacers 16 are not absolutely required in the system 10 of present invention, and the system may be constructed without spacers, as shown in FIG. 6B.

Figure 7:
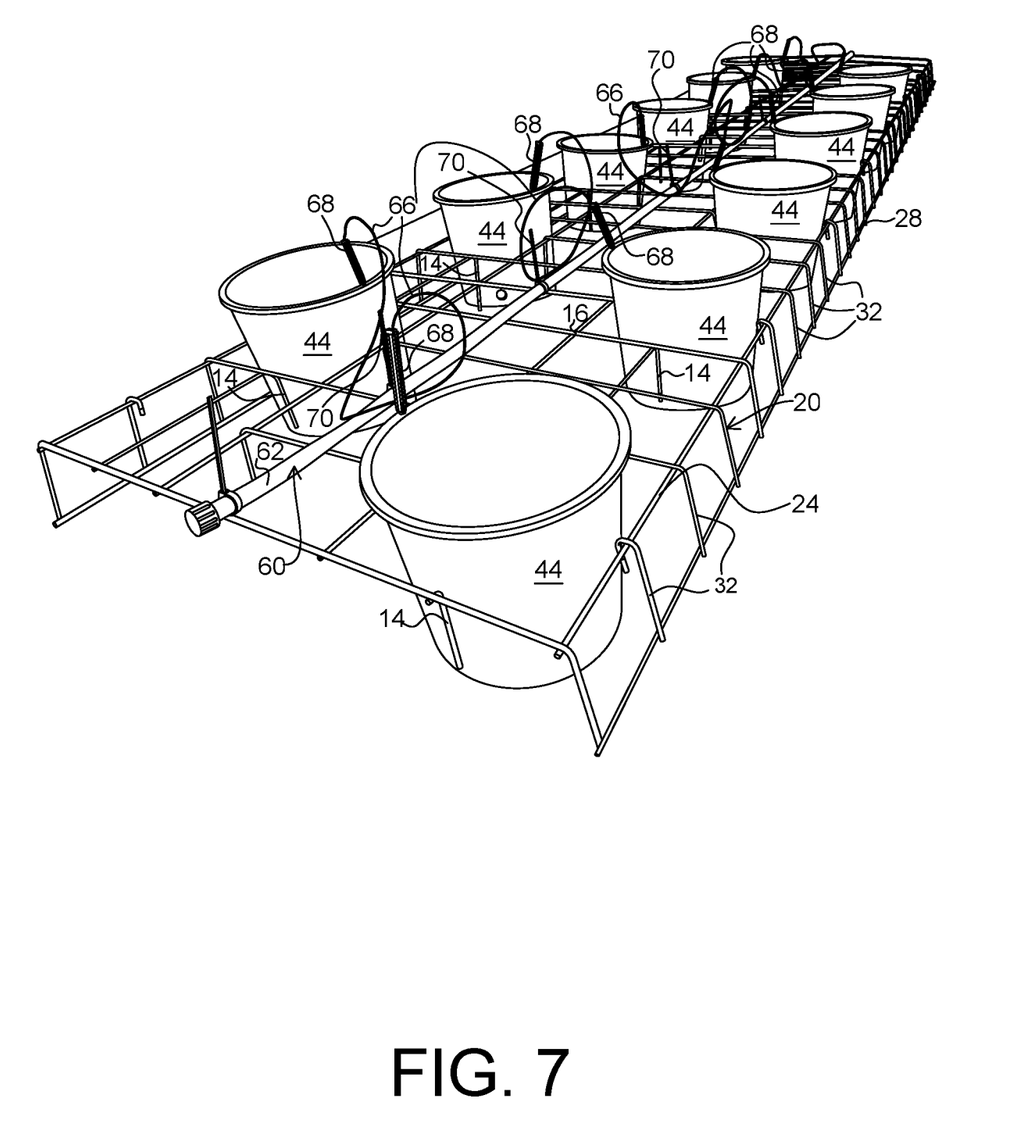
FIG. 7 is a perspective view of an exemplar of the plant stabilization system of the present invention with an irrigation system.

Turning now to FIGS. 7 and 8, the stabilization system 10 further may comprise an irrigation system 60 that allows multiple units comprising the system 10 to be connected to one water source, for a complete plant stabilization and watering system. A main irrigation line 62 connects to a primary water source at inlet valve 64 and runs the length of the plant stabilization system 10. The inlet valve 64 may be connected to a screen filter (not shown) and watering timer (not shown) and allows for the simple connection of a typical garden hose. The main irrigation line 62 may be of various dimensions based on water volume needed to efficiently water plants. The main irrigation line 62 may comprise, for example, a ¾ inch poly tubing, PVC, galvanized or copper tubing connected to the frame 12 of the system 10 by conduit clamps or zip ties 70. Individual water supply lines 66 branch from the main irrigation line 62 to carry water to each containerized plant 44 within the pockets 46 in the plant stabilization system 10. In one embodiment of the invention, the individual supply lines 66 are ¼ inch poly tubes running from the main irrigation line 62 to each pocket 46.

The irrigation system 60 may be micro or drip irrigation, overhead spray irrigation or other system. Each irrigation system has its benefits and disadvantages, and the system most suited to the plants and conditions of use may be employed. In one embodiment of the invention, the irrigation system 60 comprises a micro irrigation system connected to drip emitters 68 which provide the roots of each containerized plant 44 with its own supply of water. The main irrigation line 62 also has an exit valve (not shown) and connection fitting to enable watering of the entire plant stabilization system comprising a series of multiple frames which can be watered using one water source.

Individual frames 12 may be connected sequentially by means of metal rings, plastic zip ties, metal wire or clips, for example, for large nursery operations.

The frame 12 may further comprise a sign 72 to identify the containerized plants 44 being grown or shown on display in the plant stabilization system 10. The sign may be positioned by means known in the art, such as clip-on identification tags, at any location on the frame where it is visible. The signs aid in conducting inventory or plant identification for customers or employees.

The present invention also comprises a method of making a plant stabilization system 10. Returning to FIGS. 1 and 2, a long rectangular wire grid panel is bent to form a frame 12 having support sides 20 and 22 and creating a top surface 18 raised above the substrate 40. Support sides 20 and 22 are angled outward slightly at an angle with respect to the top side 18 of the frame 12 at an angle of about 91 degrees to about 179 degrees, as shown by angle x in FIG. 1, which enables individual units of the system 10 to be stacked or nested. In one embodiment of the invention, the support structures 20 and 22 are angled outward at an angle of about 100 to about 175 degrees with respect to the top side 18 of the frame 12. In another embodiment of the invention, the support structures 20 and 22 are angled outward at an angle of about 90 to about 135 degrees with respect to the top side 18 of the frame 12. This enables multiple frames 12 to be stacked or nested. Pockets 46 are created by cutting and removing portions of the panel wire to create void space for receiving a containerized plant 44. Alternatively, rather than removing these portions of the panel wire, they may be bent downward toward the substrate 40 to create stabilizers 14. The wire grid becomes a three-dimensional unit frame 12 capable of securely holding multiple containerized plants 44 in an upright and secure position within an integral, one-piece unit. As shown in FIGS. 6A and 6B, grids are left intact between pockets 46 to create spacers 16. To that end, the designing and fabrication process of the system 10 allows customization of the overall dimensional size of the frame 12, as well as the pockets 46, stabilizers 14 and spacers 16 to meet customer specifications. This gives the stabilization system 10 versatility to serve a greater portion of the horticulture industry, and not just one container size, spacing requirement or application. Due to the fact that there currently are no industry standards in the horticulture industry regarding container dimensions, it is impractical to manufacture a unique device for every size of container that may be manufactured. Accordingly, it is a beneficial feature of the stabilization system 10 of the present invention to be able to customize the system 10 to a customer needs. In one embodiment of the invention, the spacers 16 are formed by cross-bars as part of the surface 18 of the frame 12. As shown in FIGS. 6A and 6B, the spacers 16 are positioned between two pockets 46 to form a geometric grid pattern which facilitates the growth and maintenance of containerized plants 44 held in the stabilization system 10. The geometric grid pattern permits containerized plants 44 to be positioned directly across from each other, with two plants per row, or in alternate spacing with an offset configuration. It will be appreciated that the pockets 46 and spacers 16 of the stabilization system 10 may form various patterns which serve to stabilize the containerized plants 44 yet permit maintenance and optimize health of the plants.

A brake is used to bend the wire grid panel into the desired configuration. In one embodiment, the brake comprises a 72 inch by 144-inch metal field trailer, two metal 6-inch by 240-inch C-channels, four metal hinges and four handles to provide leverage to aid in the bending process. The tool is welded together. This tool enables the bending fabrication of custom size container pockets 46, custom spacers 16 and custom stabilizers 14 to meet the customer specifications. It also gives the ability to fabricate plant stabilization systems having a specific length, width or height. Coatings may be applied to the frame 12 after fabrication with the brake.

The present invention also is directed to a method of stabilizing containerized plants. The foregoing description of the plant stabilization system 10 is incorporated into the discussion of the method. The method comprises the step of providing counterweight leverage at a point below the center of gravity of a containerized plant 44. The method may further comprise the steps of spacing the containerized plants 44.

It now will be appreciated that the present invention provides an integral, lightweight, sturdy structure that supports multiple, vulnerable containerized plants 44, including trees, in an upright and stationary position and at a customizable uniform spacing between growing containers of varying diameters and dimensions. The plant stabilization system 10 securely holds containerized plants 44 in upright, uniform and orderly positions, thereby adding resistance against horizontal movement and against falling or blowing over. The plant stabilization system 10 of the present invention is custom designed and fabricated to secure containerized plants 44, and particularly but not by way of limitation, vulnerable plants, in a uniform, orderly fashion at a predetermined spacing based on the specific needs to optimize growth conditions and maintenance of such plants. Individual frames 12 may be aligned and attached to form designated and defined uniform growing or display areas. Due to the length of the frame 12 being much greater than the width, the overall size creates a very stable environment to combat against plants being blown over or unintentionally moved or tipped over. Pockets 46 and stabilizers 14 and/or stabilizers 14A provide both horizontal and vertical support to each containerized plant 44, holding the container securely in place without any additional apparatus such as stakes or cables. An irrigation system 60 may be coupled together to the system 10 for maintaining and nourishing plants in the stabilization system 10.

The invention has been described above both generically and with regard to specific embodiments. Although the invention has been set forth in what has been believed to be preferred embodiments, a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. A plant stabilization system for containerized plants, wherein each of the plurality of containerized plants has a center of gravity, the plant stabilization system comprising:
   a frame;
   a plurality of stabilizers positioned within a plurality of pockets formed in the frame, the plurality of stabilizers adapted to support a plurality of containerized plants by providing counterweight leverage at a point below the center of gravity of each of the plurality of containerized plants; and
   a plurality of spacers;
   wherein:
   the frame comprises a top side and the plurality of stabilizers extend downward from the top side of the frame a distance of a least 25% of the distance between the top side of the frame and a substrate upon which the frame rests;
   the shape of the frame is rectangular and the length of the frame is longer than the width of the frame;
   the frame further comprises two support structures extending the length of the frame, the two support structures being angled outward, wherein each of the two support structures comprises a top horizontal support member and a bottom horizontal support member and wherein each bottom horizontal support member is positioned distally with respect to the top side of the frame and its respective top horizontal support member to enable nesting of multiple frames comprising the system.

2. The plant stabilization system of claim 1 wherein the plurality of pockets in which the plurality of stabilizers are positioned and the plurality of spacers are geometrically configured in a grid pattern.

3. The plant stabilization system of claim 1 wherein the frame is comprised of material selected from the group consisting of titanium, nickel-titanium, steel, galvanized steel, chrome, steel chrome-plated, steel with nickel/silicon carbide composite coating, brass, brass-chrome plated, brass with nickel/silicon carbide composite, stainless steel, stainless chrome-plated, stainless with nickel/silicon carbide composite coating, carbonitrided steel, nickel carbide plated steel, tempered steel, polyvinylchloride, plastics, molded plastic, fiberglass, composites, alloys and mixtures of the foregoing.

4. The plant stabilization system of claim 1 wherein the frame, stabilizer and spacers comprise an integral unit.

5. The plant stabilization system of claim 2 wherein the plurality of stabilizers positioned within the plurality of pockets form a grid pattern with the plurality of spacers, comprising a row of stabilizers and a row of spacers and wherein one of the plurality of spacers is positioned between two of the plurality of pockets.

6. The plant stabilization system of claim 5 further comprising multiple rows of the plurality of stabilizers and a row of the plurality of spacers positioned between each of the multiple rows of the plurality of stabilizers.

7. The plant stabilization system of claim 1 wherein at least one of the plurality of stabilizers is adjustable to the dimensions of a containerized plant to be held within one of the plurality of pockets.

8. The plant stabilization system of claim 1 wherein the plurality of stabilizers are integral with the frame and are constructed from the same material as the frame.

9. The plant stabilization system of claim 1 wherein the stabilizers are angled at an angle of about 91 degrees to about 179 degrees with respect to the top side of the frame.

10. The plant stabilization system of claim 1 further comprising a drip irrigation system.

11. The plant stabilization system of claim 1 further comprising a plurality of frames that are secured together.

12. The plant stabilization system of claim 1 further comprising a sign.

13. The plant stabilization system of claim 1 wherein the plurality of stabilizers extend downward to a substrate upon which the frame rests.

14. The plant stabilization system of claim 13 wherein the stabilizers further comprise support feet.

15. The plant stabilization system of claim 1 further comprising a plurality of vertical connecting supports that connect each top horizontal support member to its respective bottom horizontal support member and the plurality of vertical connecting supports is angled outward with respect to the top side of the frame at an angle of about 91 to about 179 degrees.

16. The plant stabilization system of claim 1 wherein the frame has a width and a length and the length of the frame is greater than the width of the frame to create a stable environment for a containerized plant which may be held within the frame.

17. A plant stabilization system for containerized plants, wherein each of the plurality of containerized plants has a center of gravity, the plant stabilization system comprising:
a frame; and
a plurality of stabilizers positioned within a plurality of pockets formed in the frame, the plurality of stabilizers adapted to support a plurality of containerized plants by providing counterweight leverage at a point below the center of gravity of each of the plurality of containerized plants;
wherein:
the frame comprises a top side and the plurality of stabilizers extend downward from the top side of the frame a distance of a least 25% of the distance between the top side of the frame and a substrate upon which the frame rests;
the shape of the frame is rectangular and the length of the frame is longer than the width of the frame;
the frame further comprises two support structures extending the length of the frame, the two support structures being angled outward, wherein each of the two support structures comprises a top horizontal support member and a bottom horizontal support member and wherein each bottom horizontal support member is positioned distally with respect to the top side of the frame and its respective top horizontal support member to enable nesting of multiple frames comprising the system.

18. The plant stabilization system of claim 17 wherein at least one of the plurality of stabilizers is adjustable to the dimensions of a containerized plant to be held within one of the plurality of pockets.

19. The plant stabilization system of claim 17 wherein the plurality of stabilizers are integral with the frame and are constructed from the same material as the frame.

20. The plant stabilization system of claim 17 wherein the stabilizers are angled at an angle of about 90 degrees to about 180 degrees with respect to the top side of the frame.

21. The plant stabilization system of claim 17 further comprising a drip irrigation system.

22. The plant stabilization system of claim 17 further comprising a plurality of frames that are secured together.

23. The plant stabilization system of claim 17 further comprising a sign.

24. The plant stabilization system of claim 17 wherein the plurality, of stabilizers extend downward to a substrate upon which the frame rests.

25. The plant stabilization system of claim 24 wherein the stabilizers further comprise support feet.

26. The plant stabilization system of claim 17 further comprising a plurality of vertical connecting supports that connect each top horizontal support member to its respective bottom horizontal support member and the plurality of vertical connecting support is angled outward with respect to the top side of the frame at an angle of about 91 to about 179 degrees.

27. The plant stabilization system of claim 17 wherein the frame has a width and a length and the length of the frame is greater than the width of the frame to create a stable environment for a containerized plant which may be held within the frame.

28. The plant stabilization system of claim 17 wherein the frame comprises a top side and wherein the stabilizers are angled inward with respect the top side of the frame at an angle of about 90 degrees to about 180 degrees.

\* \* \* \* \*